(12) United States Patent
Onitake et al.

(10) Patent No.: US 11,117,599 B2
(45) Date of Patent: Sep. 14, 2021

(54) AIR FLOW REGULATION MEMBER AND METHOD FOR MANUFACTURING AIR FLOW REGULATION MEMBER

(71) Applicant: KAWASAKI JUKOGYO KABUSHIKI KAISHA, Kobe (JP)

(72) Inventors: Yasuo Onitake, Akashi (JP); Hiroshi Yoshizumi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 136 days.

(21) Appl. No.: 16/349,929

(22) PCT Filed: Mar. 15, 2017

(86) PCT No.: PCT/JP2017/010310
§ 371 (c)(1),
(2) Date: May 14, 2019

(87) PCT Pub. No.: WO2018/087942
PCT Pub. Date: May 17, 2018

(65) Prior Publication Data
US 2019/0337535 A1    Nov. 7, 2019

(30) Foreign Application Priority Data
Nov. 14, 2016   (JP) .............................. JP2016-221410

(51) Int. Cl.
*B61D 27/00*  (2006.01)
*B60H 1/34*   (2006.01)
*B60H 1/00*   (2006.01)

(52) U.S. Cl.
CPC ......... *B61D 27/009* (2013.01); *B60H 1/3407* (2013.01); *B60H 1/00371* (2013.01)

(58) Field of Classification Search
CPC .............. B61D 27/009; B61D 27/0018; B60H 1/3407; B60H 3/06; F24F 13/082;
(Continued)

(56) References Cited

U.S. PATENT DOCUMENTS 1,517,841 A * 12/1924 Kuhn ...................... F24F 13/08
454/290
2,396,735 A *  3/1946 Leigh ..................... F24F 13/08
52/799.14
(Continued)

FOREIGN PATENT DOCUMENTS

| JP | 1975-114960 | 9/1975 |
|----|-------------|--------|
| JP | 1980-015521 | 1/1980 |

(Continued)

*Primary Examiner* — Steven B McAllister
*Assistant Examiner* — Charles R Brawner
(74) *Attorney, Agent, or Firm* — Fay Kaplun & Marcin, LLP

(57) ABSTRACT

An air flow regulator for a railway vehicle is configured so that the rattling of bars can be prevented without using welding, an affixation member, etc. An intake grill is provided at an intake opening for sucking air from an interior of a railway vehicle. The intake grill includes a frame, bars, and a reinforcement capable of deforming the bars. The frame defines an outer edge of the intake opening. The bars are plate-shaped members spanned between portions of the frame to connect the portions to each other. The reinforcement elastically deforms the bars to generate reaction force therein.

18 Claims, 13 Drawing Sheets

(58) Field of Classification Search
CPC .......... F24F 13/084; E06B 7/082; E06B 7/08; E06B 9/01
USPC ....................................................... 454/104
See application file for complete search history.

(56) References Cited

U.S. PATENT DOCUMENTS

| | | | |
|---|---|---|---|
| 3,968,738 A | | 7/1976 | Matzke |
| 6,012,767 A | * | 1/2000 | Farmont ................ B60J 7/0038 160/201 |
| 6,105,318 A | * | 8/2000 | Harrison ................... E06B 9/24 52/200 |
| 9,074,408 B2 | * | 7/2015 | Sung ........................ E06B 7/02 |
| 2005/0252087 A1 | * | 11/2005 | Hsu ........................ E06B 7/08 49/92.1 |
| 2011/0293959 A1 | * | 12/2011 | Heng ..................... B21D 47/04 428/592 |
| 2014/0335773 A1 | | 11/2014 | Takahashi et al. |
| 2016/0298331 A1 | | 10/2016 | Bruhnke et al. |

FOREIGN PATENT DOCUMENTS

| | | | |
|---|---|---|---|
| JP | S-5515521 U | * | 1/1980 |
| JP | S-56161231 | * | 1/1981 |
| JP | 1981-161231 | | 12/1981 |
| JP | 1982-138716 | | 8/1982 |
| JP | 2012-006529 | | 1/2012 |
| JP | 2012-0065293 | | 1/2012 |
| JP | 2013-122362 | | 6/2013 |

* cited by examiner

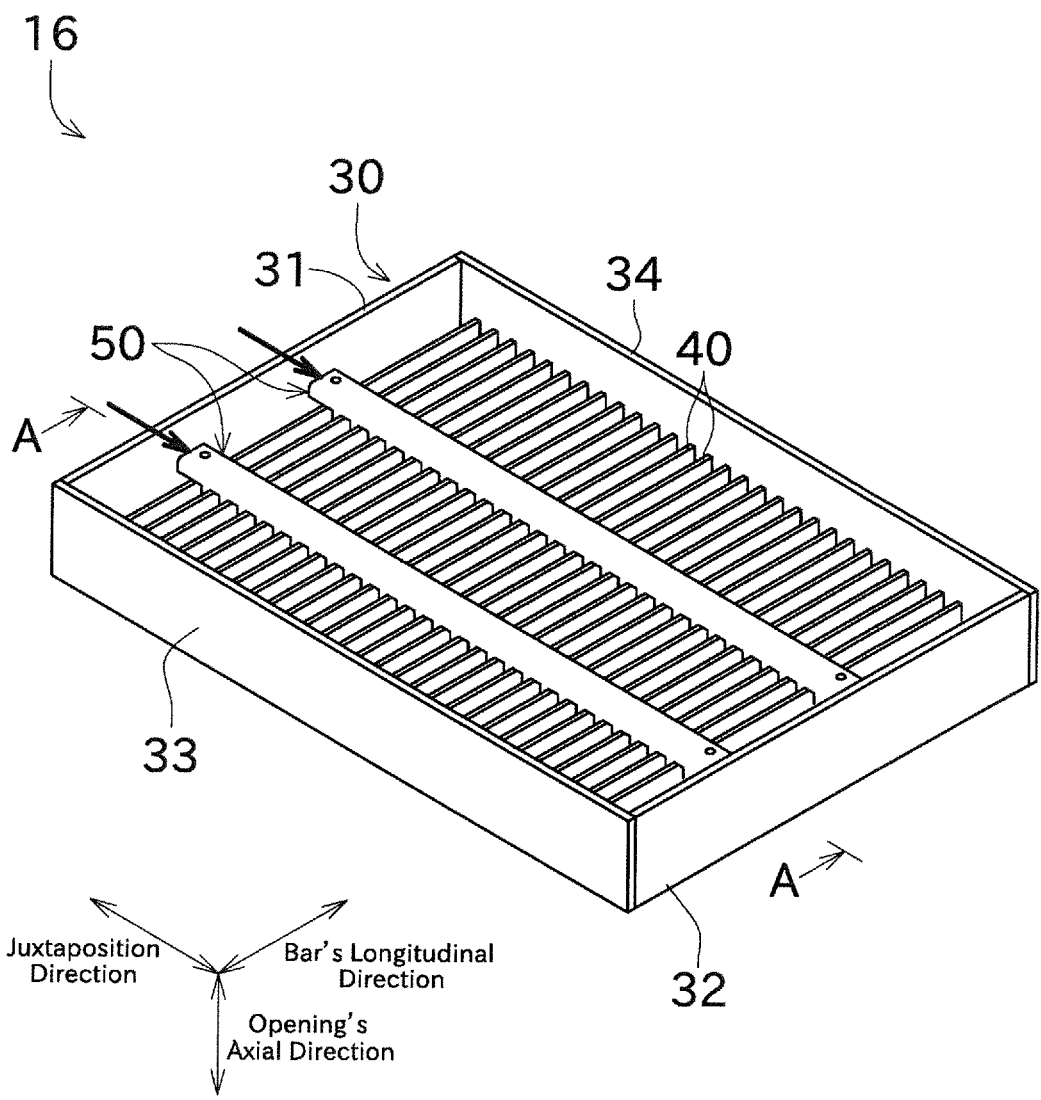

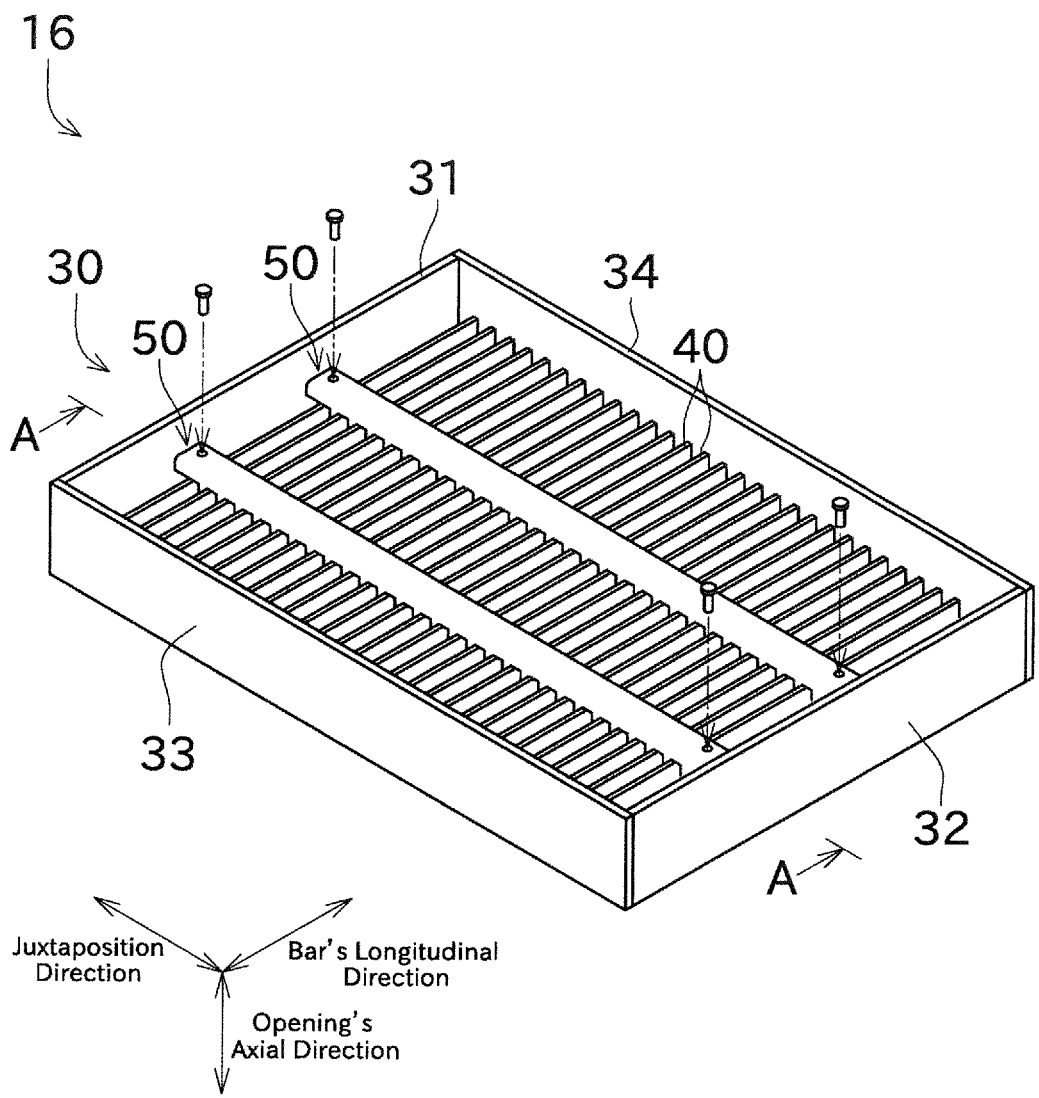

AIR FLOW REGULATION MEMBER AND METHOD FOR MANUFACTURING AIR FLOW REGULATION MEMBER

TECHNICAL FIELD

The present disclosure relates mainly to an air flow regulator provided at a ventilation opening for at least either blowing air to an interior of a railway vehicle or sucking air from the interior of the railway vehicle.

BACKGROUND ART

Patent Literature 1 discloses a ventilation louver (air flow regulator) provided at a ceiling opening of a railway vehicle. This louver includes multiple blades, multiple spacers, a penetrating shaft, and nuts. The blades are plate-shaped members juxtaposed at regular intervals over the ceiling opening. Through holes are formed in the blades. The spacers are circularly cylindrical members each of which is arranged between the blades. The penetrating shaft is passed through the through holes of the blades and the spacers. Both end portions of the penetrating shaft are formed as thread portions. The nuts are provided on the thread portions. The blades can be clamped and fastened with the spacers thereamong by tightly screwing the nuts on the thread portions, thereby being reinforced and prevented from rattling.

CITATION LIST

Patent Literature

Patent Literature 1: Utility Model Laid Open Gazette No. S57-138716

SUMMARY OF THE DISCLOSURE

Technical Problem to be Solved by the Disclosure

However, the louver of Patent Literature 1 needs to have all its blades formed with through holes, and needs many spacers, thereby increasing cost of components. Further, the louver of Patent Literature 1 needs a process for arranging each spacer between each pair of blades and another process for passing the penetrating shaft through the blades and the spacers, thereby increasing the number of assembly processes. Even if other members for reinforcing bars (the blades) are provided to replace the spacers and are attached to the bars by welding, there must be many welded portions, thereby increasing the number of assembly processes.

The present disclosure relates to an air flow regulator for a railway vehicle with a configuration for preventing rattling of the bar without using welding, an affixation member or so on.

In a first aspect of the disclosure, provided is an air flow regulator having the following configuration. The air flow regulator is provided at a ventilation opening for at least either blowing air to an interior of a railway vehicle or sucking air from the interior of the railway vehicle. The air flow regulator comprises a frame, a bar, and a deformation means. The frame defines an outer edge of the ventilation opening. The bar is a plate-shaped member spanned between portions of the frame so as to connect the portions to each other. The deformation means elastically deforms the bar so as to generate a reaction force in the bar.

In a second aspect of the disclosure, provided is a method for manufacturing an air flow regulator provided at a ventilation opening for at least either blowing air to an interior of a railway vehicle or sucking air from the interior of the railway vehicle. The method for manufacturing the air flow regulator comprises a deformation step and a fixation step. The deformation step is performed to elastically deform a bar, which is a plate-shaped member spanned between portions of a frame so as to connect the portions to each other, the frame defining an outer edge of the ventilation opening. The fixation step is performed to fix the bar to the frame while keeping the bar elastically deformed by the deformation step.

Therefore, a reaction force (an elastic force) is generated in the bar because of the elastic deformation, the bar and another member contacting the bar are affected by the force therebetween so that rattling of the bar is prevented without using welding, an affixation member or so on.

Effect of the Disclosure

The disclosure achieves an air flow regulator for a railway vehicle, configured so that rattling of a bar can be prevented without using welding, an affixation member or so on.

BRIEF DESCRIPTION OF THE DRAWINGS

FIG. 4 A perspective view showing bars elastically deformed by sliding the reinforcements.

FIG. 7 A perspective view of the reinforcements attached and fixed to a frame.

DETAILED DESCRIPTION OF EMBODIMENTS

Figure 1:
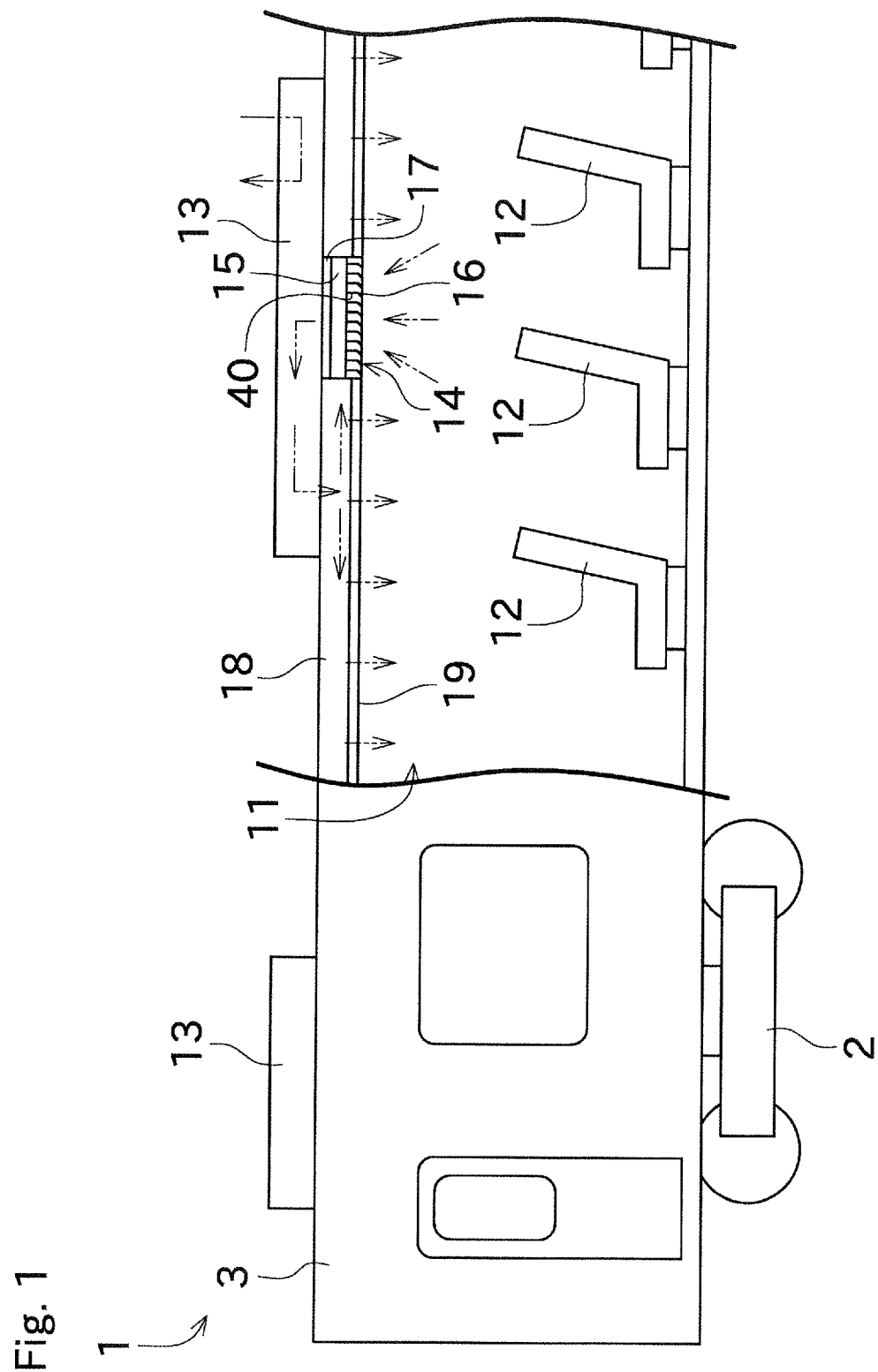
FIG. 1 A side view of a railway vehicle to which an intake grill (an air flow regulator) according to an embodiment is attached.

Embodiments of the present disclosure will now be described with reference to drawings. First, referring to FIGS. 1 and 2, a brief description is given of a railway vehicle 1 to which an intake grill (an air flow regulator) 16 according to an embodiment of the disclosure is attached. In FIG. 1, air flows are drawn in dotted lines.

As shown in FIG. 1, the railway vehicle 1 includes a wheel truck 2 and a vehicle body 3. The carrier 2 is disposed under the vehicle body 3 so as to support the vehicle body 3, and the carrier 2 includes wheels for traveling on unillustrated rails.

The vehicle body 3 is formed in an approximate box-like shape, and includes an interior 11 formed therein. Seats 12 are provided on a bottom surface (a floor surface) of the interior 11. An upper surface (a ceiling surface) of the interior 11 is formed with an intake opening 14 serving as an opening for sucking air from the interior 11.

Figure 2:
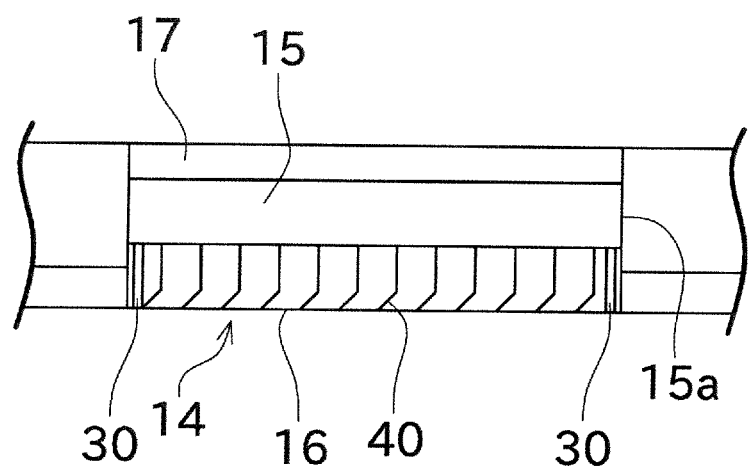
FIG. 2 A sectional side view of surroundings of an intake opening of the railway vehicle.

Air sucked via the intake opening 14 flows along an intake duct 15. The intake duct 15 connects the interior 11 to an air conditioner 13 disposed on a roof of the vehicle body 3. As shown in FIGS. 1 and 2, an intake grill 16 and an air filter 17 are disposed in the intake duct 15. The intake grill (air flow regulator) 16 is provided at the intake opening 14. More specifically, the intake grill 16 includes a frame 30, which is disposed on an inner intake duct wall surface 15a, and a plurality of bars 40 (e.g., slats), which are disposed inside of the frame 30 to regulate the direction of sucking air. A concrete configuration of the intake grill 16 will be described later. The air filter 17 removes dust and so on involved in the air flowing along the intake duct 15.

The air conditioner 13 includes an air blower for sucking air from the interior 11, a heater part for heating the sucked air, and a cooler part for cooling the sucked air. The air taken into the air conditioner 13 has a temperature adjusted by the heater part or the cooler part, and is blown to an outlet duct 18 by the air blower. Further, according to the present embodiment, the air conditioner 13 includes a device for sucking air (outside air) from the outside of the vehicle body 3, and for blowing air to the outside of the vehicle body 3.

The air blown to the outlet duct 18 is blown to the interior 11 from a plurality of outlet openings 19 formed in the upper surface of the interior 11. Due to the above-mentioned configuration, the temperature of air in the interior 11 can be adjusted.

Figure 3:
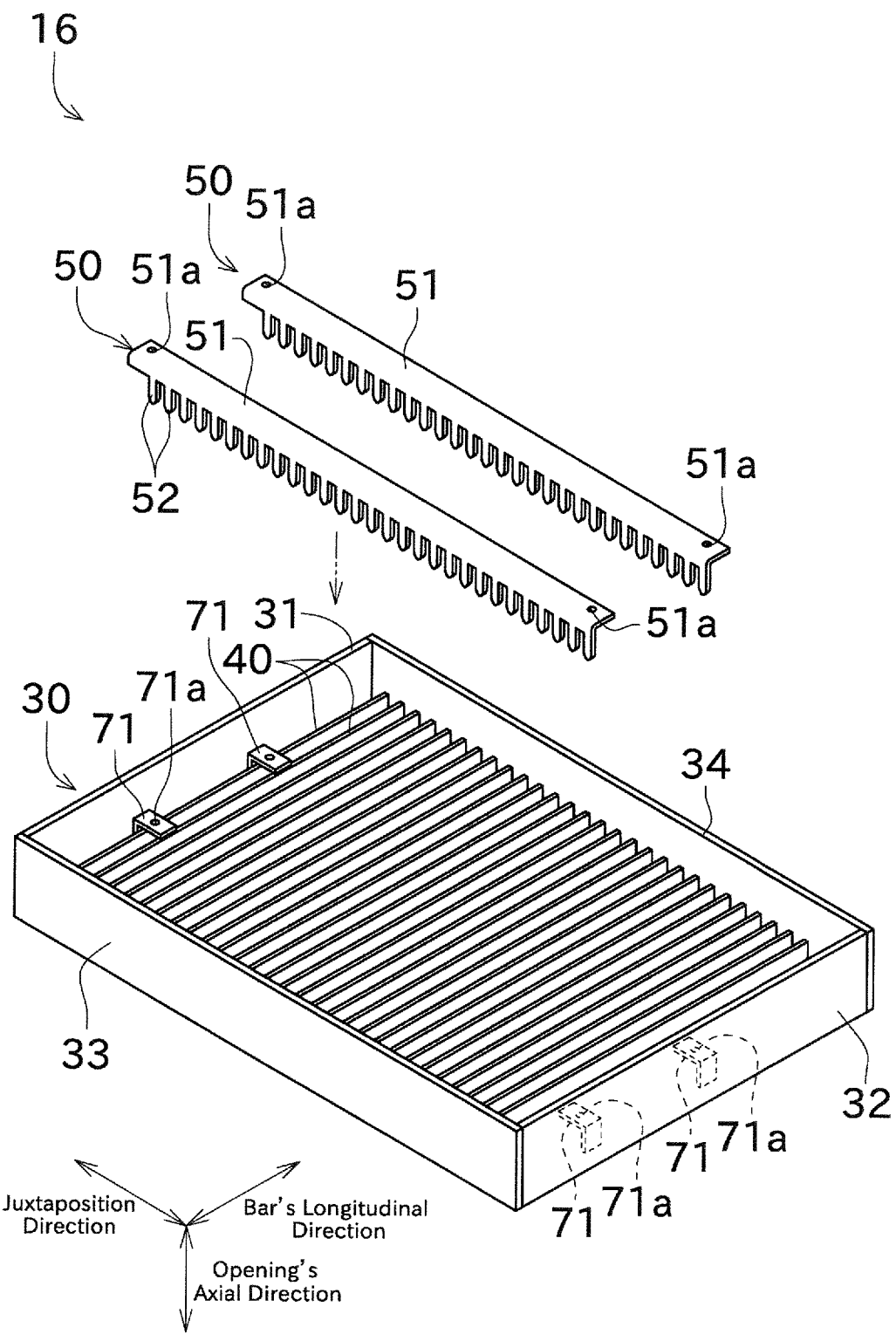
FIG. 3 A perspective view showing arrangement of reinforcements.

Referring mainly to FIG. 3, component members of the intake grill 16 will now be described in detail. In the following description, a direction of juxtaposing the bars 40 in such a way as shown in FIG. 3 is simply referred to as "juxtaposition direction", a longitudinal direction of each bar 40 is referred to as "bar's longitudinal direction", and an axial direction of the intake opening 14 (a vertical direction in FIG. 3, or a direction perpendicular to both the juxtaposition direction and the bar's longitudinal direction) is referred to as "opening's axial direction". The air in the interior 11 flows upward from the lower side in FIG. 3.

As shown in FIGS. 2 and 3, the intake grill 16 includes the frame 30, the bars 40 and a reinforcement 50. The intake grill 16 may be made of any material. For example, a preferable material is metal such as aluminum or stainless. All the component members of the intake grill 16 may not be made of common material. For example, at least one member may be made of different material.

The frame 30 defines an outer edge of the intake opening 14 (in other words, it is disposed on the inner intake duct wall surface 15a at an end of the intake duct 15 facing the interior 11 (see FIG. 2)). According to the present embodiment, the intake opening 14 is rectangular, so that the frame 30 is also a rectangular frame-shaped member. The frame 30 includes a first side wall 31, a second side wall 32, a third side wall 33 and a fourth side wall 34. Flat plate-shaped members serve as the respective side walls. The side walls are joined to one another by affixation members, welding or so on so as to form the frame-shape.

The first side wall 31 and the second side wall 32 are disposed perpendicular to the juxtaposition direction so as to oppose each other. The third side wall 33 and the fourth side wall 34 are disposed perpendicular to the bar's longitudinal direction so as to oppose each other.

As shown in FIG. 3, reinforcement mounting brackets 71 are joined to the frame 30 by affixation members, welding, or so on. The reinforcement mounting brackets 71 are joined to inside wall surfaces of the first and second side walls 31 and 32 (inside of the frame 30). The reinforcement 50 is mounted on the reinforcement mounting brackets 71. According to the present embodiment, the intake grill 16 includes two reinforcements 50, so that two reinforcement mounting brackets 71 are provided on the first side wall 31, and other two reinforcement mounting brackets 71 on the second side wall 32. Each reinforcement mounting bracket 71 includes a plate-shaped portion having a flat surface perpendicular to the opening's axial direction. This plate-shaped portion is formed with a mounting hole 71a. The mounting hole 71a is formed so that its axial direction coincides to the opening's axial direction.

Figure 5A:
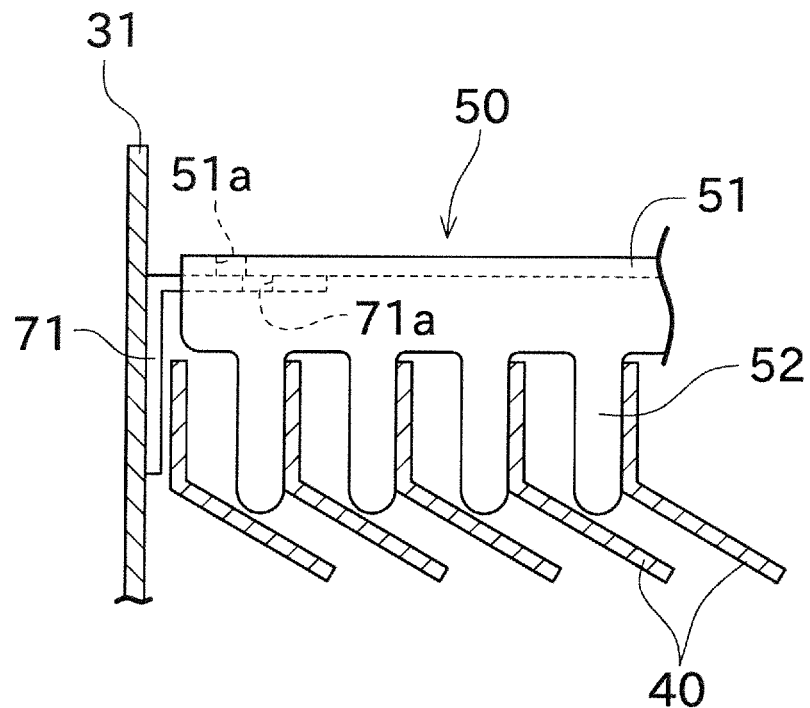
FIGS. 5(a) and 5(b) A sectional view taken along A-A line of the bars before they are elastically deformed, and another sectional view taken along A-A line of the bars elastically deformed.
Figure 5B:
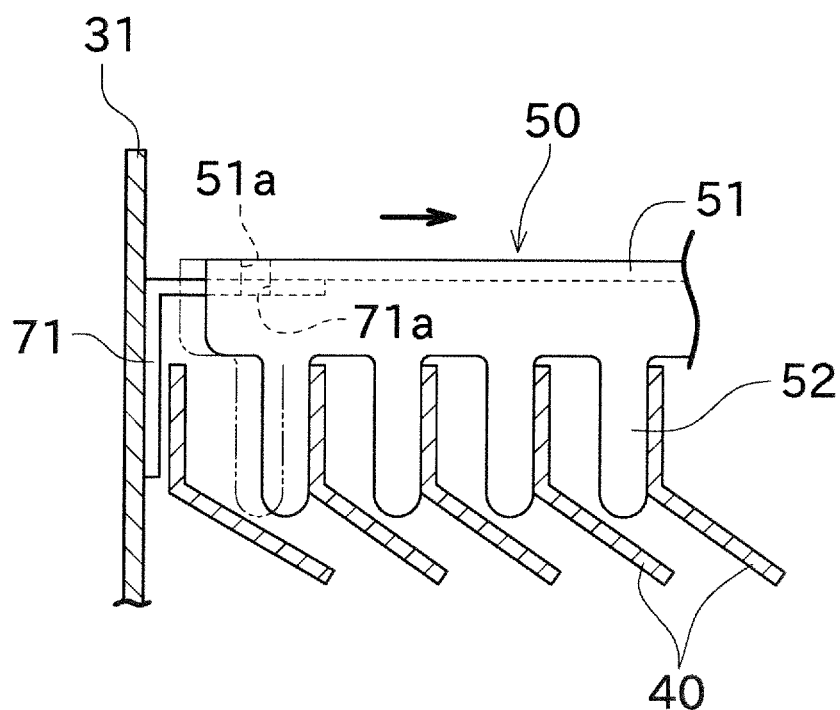
Figure 6A:
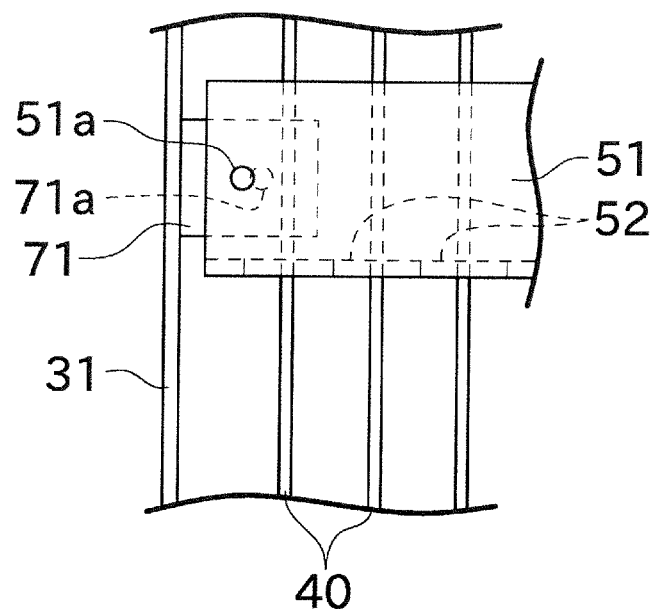
FIGS. 6(a) and 6(b) A plan view of the bars before they are elastically deformed, and another plan view of the bars elastically deformed.
Figure 6B:
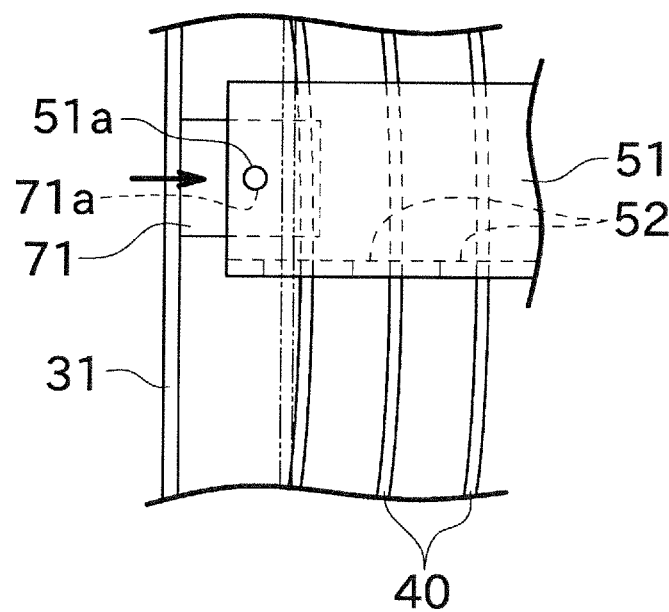
Figure 8A:
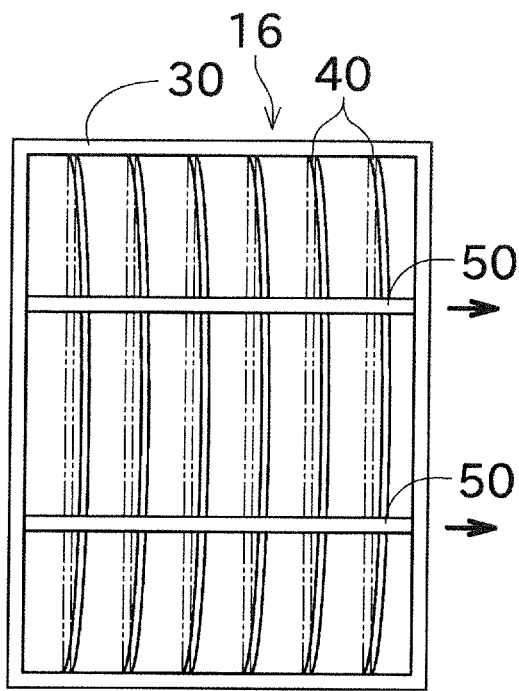
FIGS. 8(a), 8(b), 8(c) and 8(d) Views showing examples regarding the number of the reinforcements and sliding directions of the reinforcements.
Figure 8B:
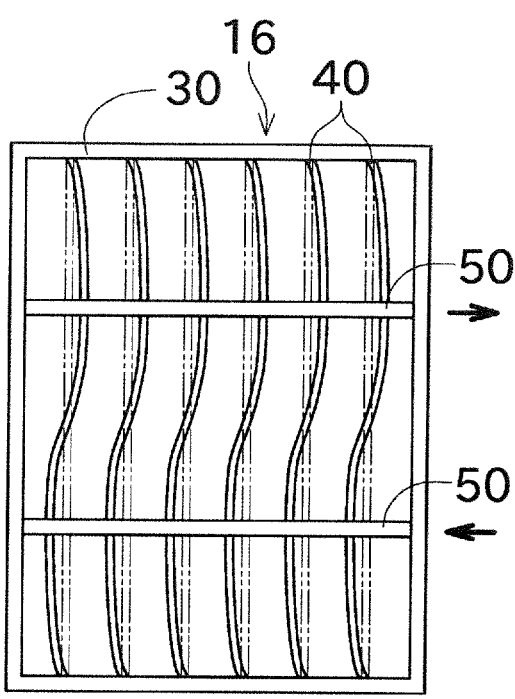
Figure 8C:
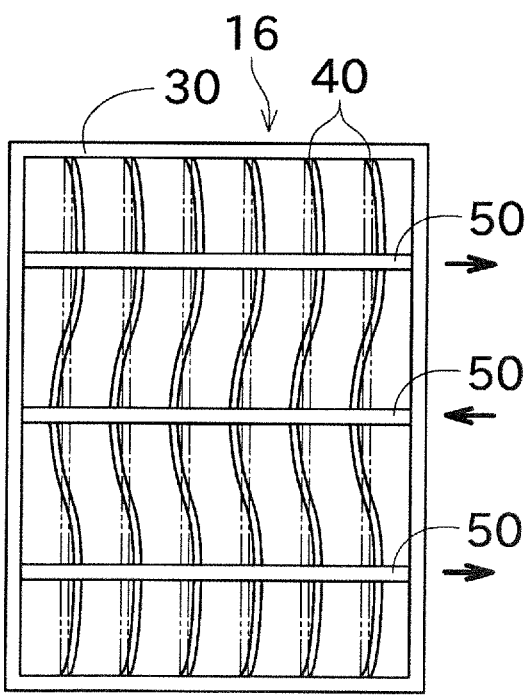
Figure 8D:
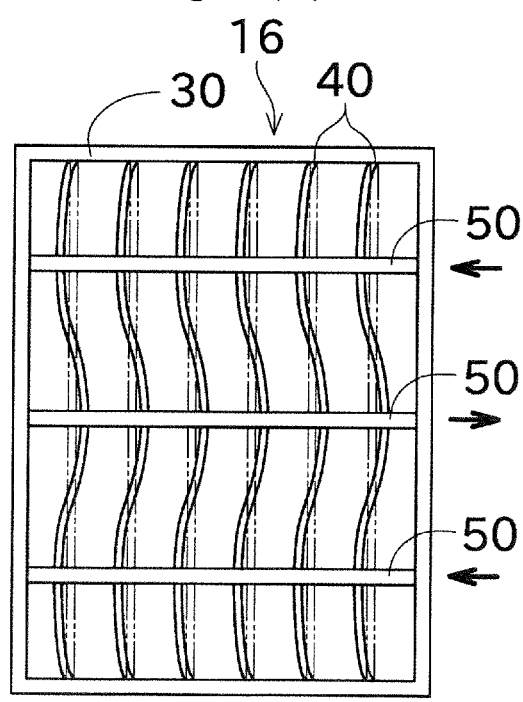

The bar 40 is a plate-shaped member spanned between portions of the frame 30 so as to connect the portions to each other (according to the present embodiment, so as to connect the third side wall 33 and the fourth side wall 34 to each other). The intake grill 16 includes the plurality of bars 40. The bars 40 are juxtaposed in a certain direction (the juxtaposition direction) and are oriented in the same direction. The bars 40 are bent as shown in FIGS. 5(a)-5(b). More specifically, referring to the sectional view of FIGS. 5(a)-5(b), the bars 40 are formed parallel to the opening's axial direction on the side thereof facing the inside of the intake duct 15 (on the upper side of FIGS. 5(a)-5(b)), and are bent to intersect the opening's axial direction on the side thereof facing the interior 11 (on the lower side of FIGS. 5(a)-5(b)). Due to this configuration, the inside of the intake opening 14 is invisible to a person in the interior 11.

The reinforcements 50 are comb-toothed members which are L-like shaped in section as shown in FIG. 3. The reinforcements 50 are disposed so as to intersect the bars 40 and so as to contact the bars 40, thereby reinforcing the bars 40. According to the present embodiment, the intake grill 16 includes the pair of reinforcements 50 whose shapes are identical to each other. As shown in FIGS. 5(a)-5(b), each reinforcement 50 includes a base portion 51 and protrusions 52.

The base portion 51 is a plate-shaped portion disposed so that its thickness direction coincides to the opening's axial direction. The base portion 51 is long narrow so that its longitudinal direction coincides to the juxtaposition direction. The protrusions 52 are formed on a longer side (one side end in the bar's longitudinal direction) of the base portion 51 so as to extend to one side (toward the interior 11) in the opening's axial direction. The protrusions 52 have respective arcuate tips. The protrusions 52 are formed at intervals identical to the juxtaposition intervals of the bars 40. The base portion 51 is formed with mounting holes 51a close to both ends thereof in the juxtaposition direction, as shown in FIG. 3. The mounting holes 51a are formed so that their axial directions coincide to the opening's axial direction. The mounting holes 51a are holes for mounting the reinforcement 50 to the reinforcement mounting brackets 71.

Assembly processes of the intake grill 16 will now be described with reference to FIGS. 3 to 7.

First, the bars 40 are attached to the frame 30 by affixation members, welding or so on (bar attachment step). FIG. 3 illustrates the intake grill 16 including the attached bars 40.

Subsequently, the reinforcements 50 are disposed (put) on the bars 40 (reinforcement arrangement step). The protrusions 52 are inserted one by one into respective spaces among the bars 40 because the intervals among the bars 40 are identical to the intervals among the protrusions 52 as mentioned above. In this step, the reinforcements 50 are not fixed but are merely placed on upper surfaces of the bars 40. As shown in FIGS. 5(*a*) and 6(*a*), in this step, the mounting holes 51*a* are not positioned to coincide to the mounting holes 71*a* (the mounting holes 51*a* are closer to the first side wall 31). Similarly, the mounting holes 51*a* and the mounting holes 71*a* close to the second side wall 32 do not coincide to each other, although they are not illustrated in FIGS. 5(*a*), 5(*b*), 6(*a*) and 6(*b*).

Then, as shown in FIG. 4, the reinforcements 50 are pushed (slid) toward the second side wall 32 (in the juxtaposition direction) (deformation step). Accordingly, as shown in FIGS. 5(*b*) and 6(*b*), the protrusions 52 press and deform the bars 40. The deformation of the bars 40 is elastic deformation so that the bars 40 are pressed against the protrusions 52 by their elastic forces (reaction forces). If the reinforcements 50 are removed, the bars 40 return to their initial position (the position as shown in FIG. 5(*a*)). The only required thing is that the deformation of the bars 40 includes elastic deformation (in other words, it is enough if they press the protrusions 52 by their reaction forces). Therefore, the return of the bars 40 to their initial position when the reinforcements 50 are removed may be incomplete.

In this way, the bars 40 are pressed by the protrusions 52 so that one side surfaces of the bars 40 contact one side surfaces of the protrusions 52 (the other side surfaces of the bars 40 do not contact the other side surfaces of the protrusions 52). Especially, the displacement of each deformed bar 40 is maximum at its portion close to the protrusion 52, and is reduced as a distance from the protrusion 52 increases. Therefore, the bars 40 are formed with curves expanding in one direction so that the bars 40 contact the reinforcements 50 (protrusions 52) at the maximum expanded curve portions thereof. According to the present embodiment, two reinforcements 50 are provided so that the bars 40 expand in one direction at portions thereof adjacent to the two reinforcements 50.

By sliding each reinforcement 50, the mounting hole 51*a* close to the first side wall 31 comes to coincide to the corresponding mounting hole 71*a* positionally (in the juxtaposition direction), as shown in FIGS. 5(*b*) and 6(*b*). Similarly, the mounting hole 51*a* close to the second wall side part 32 also comes to coincide to the corresponding mounting hole 71*a* positionally (in the juxtaposition direction). In this state, as drawn in dotted lines in FIG. 7, the reinforcements 50 are fixed to the frame 30 by affixation members, e.g., rivets, so that the bars 40 having been elastically deformed are fixed to the frame 30 simultaneously (fixation step). Incidentally, the fixation step of fixing the bars 40 to the frame 30 may be performed to fix the bars 40 to the frame 30 via an additional member, e.g., the reinforcements 50, in such a way as illustrated according to the present embodiment, or may be performed to directly fix the bars 40 to the frame 30.

In this way, the elastic deformation of the bars 40 to generate the reaction forces in the bars 40 corresponds to a function of a deformation means. To realize the function of the deformation means, according to the present embodiment, the configuration of sliding the reinforcements 50 to bring one side surfaces of the protrusions 52 into contact with one side surfaces of the bars 40 is employed. Since the intake grill 16 is assembled in the above-mentioned manner and the reinforcements 50 are pressed against the bars 40 to deform the bars 40, the bars 40 can be connected to the reinforcements 50 without rattling. Especially, the railway vehicle 1 is liable to generate the rattling by its vibration or so on, and a stiff wind often passes through the intake grill 16, thereby increasing the tendency of generating the rattling. Therefore, conventionally, structural complication such as disclosed by Patent Literature 1 or welding at many positions was required. However, by employing the configuration according to the present embodiment, fixation by rivets or by welding is not required, thereby greatly simplifying the assembly processes.

Further, according to the present embodiment, the protrusions 52 are inserted one by one into respective spaces among the bars 40. Therefore, even if the bars 40 are going to be further bent by a great force, the bars 40 abut against the protrusions 52 (the protrusions 52 function as a stopper), thereby preventing the bars 40 from being excessively bent.

In this regard, the deformation degree of the bars 40 needs not be so large because the purpose of elastic deformation of the bars 40 is just prevention of rattling. For example, if the longitudinal length of the bar 40 is 1000, a preferable deformation degree (movement degree) in the juxtaposition direction at its portion contacting the protrusion 52 is about 1 to 10. Incidentally, in order to prevent an air conditioner or an inside of a duct from being visible to passengers or so on, it is preferable that the bars 40 are greatly bent. For example, each bar 40 is bent to a position where it overlaps another adjoining bar 40 when viewed in the opening's axial direction. Further, when the bending angle of the bar 40 is large, the rigidity of the bar 40 becomes large. Therefore, the bars 40 are prevented from rattling or vibrating when the bars 40 are pressed by the reinforcements 50. Further, the deformation degree of the bars 40 when they are pressed is reduced so as to reduce their distortion, thereby minimizing their detraction from aesthetics.

Description will now be given of a direction of sliding the reinforcements 50 with reference to FIGS. 8(*a*)-8(*d*). In FIGS. 8(*a*)-8(*d*), in order to facilitate understanding of shapes of the deformed bars 40, the bars 40 are illustrated as being deformed to a degree larger than their actual deformation degree, and the bars 40 before they are deformed are illustrated in dotted lines.

FIG. 8(*a*) illustrates a configuration including two reinforcements 50 similar to those in the present embodiment, where slide directions of the reinforcements 50 are identical to each other. Alternatively, as shown in FIG. 8(*b*), two reinforcements 50 adapted to slide in different directions may be provided. A single reinforcement 50 or more than two reinforcements 50 may be provided. A configuration including three reinforcements 50 is illustrated in each of FIGS. 8(*c*) and 8(*d*). On the assumption that three reinforcements 50 are provided, if all of them are slid in the same direction, the center reinforcement 50 may not press the bars 40, or may press the bars 40 by a weak pressure force. As a result, the rattling may be insufficiently suppressed. Therefore, in the case where three reinforcements 50 are provided, it is preferable that the sliding direction of the center reinforcement 50 is different from the sliding direction of the two end reinforcements 50, as shown in each of FIGS. 8(*c*) and 8(*d*). Alternatively, the sliding direction of the center and one end reinforcements 50 may be different from the sliding direction of the other end reinforcement 50. If more than three reinforcements 50 are provided, the same thing is adapted.

Alternative embodiments as modifications of the foregoing embodiment will now be described. In the following description of the alternative embodiments, the same reference numerals in drawings designate members identical or similar to those in the foregoing embodiment, and description of such members may be omitted.

Figure 9A:
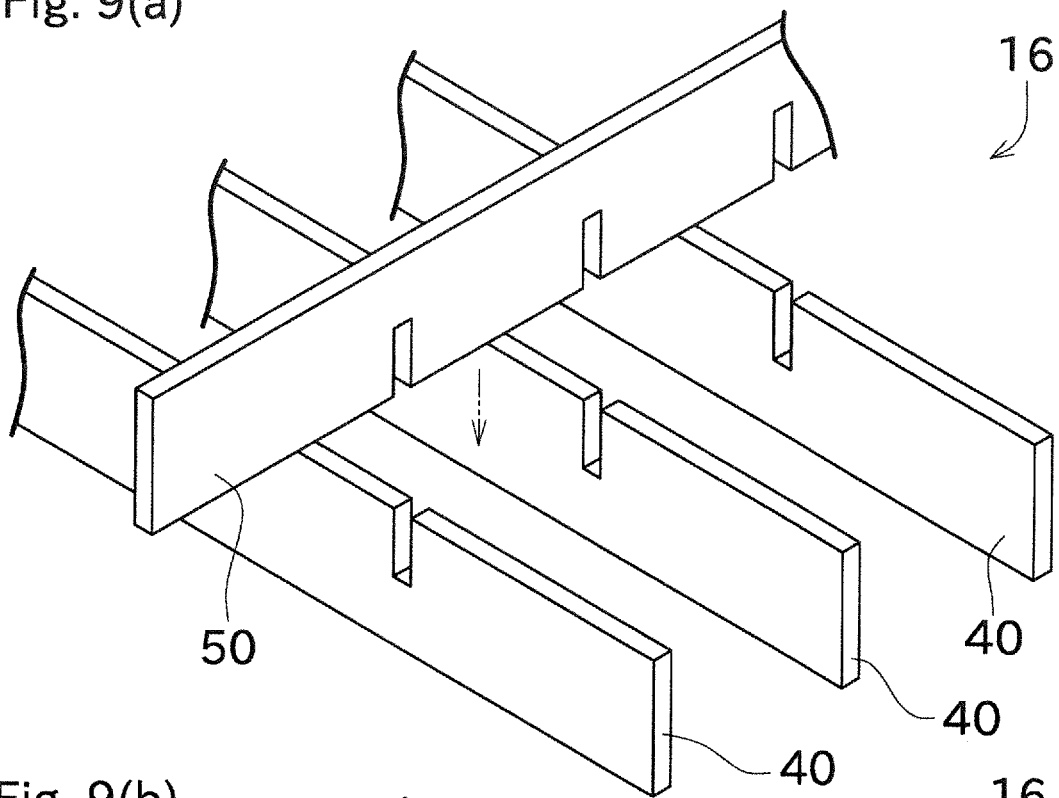
FIGS. 9(a) and 9(b) Perspective views of an intake grill according to a first alternative embodiment in which both the bars and the reinforcement are formed with notches.
Figure 9B:
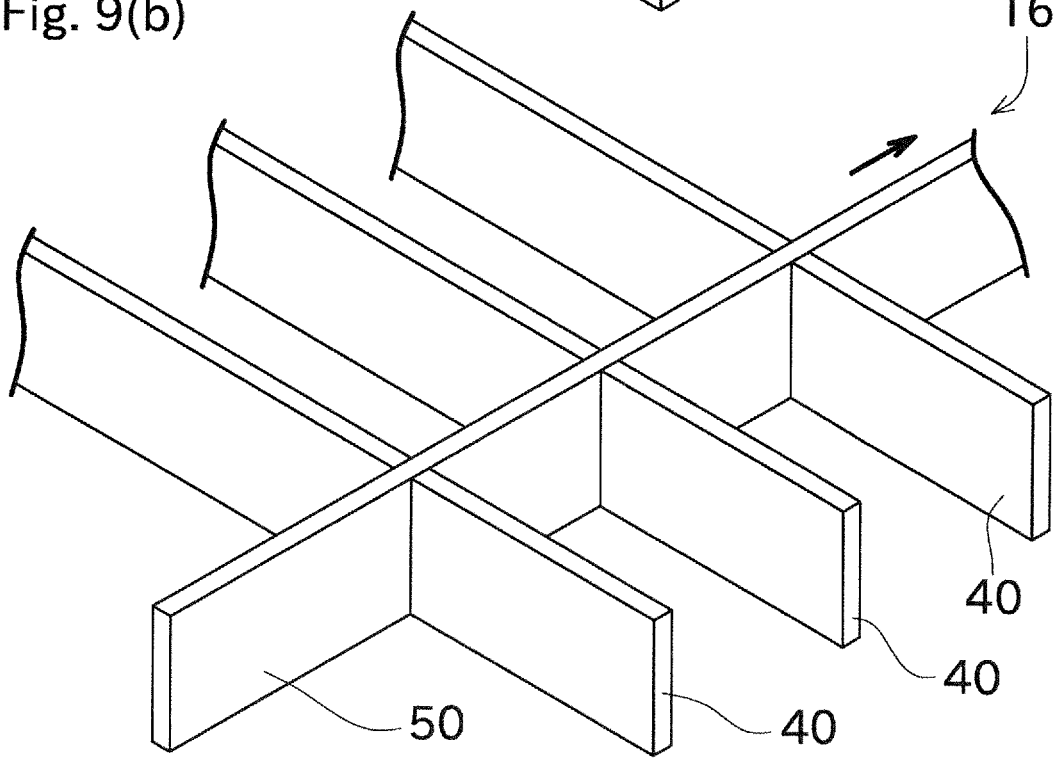

FIGS. 9(a)-9(b) illustrate an intake grill 16 according to a first alternative embodiment. In the first alternative embodiment, bars 40 and reinforcements 50 are formed with notches. More specifically, as shown in FIG. 9(a), the bars 40 and the reinforcements 50 are formed with notches having appropriate widths and depths at positions corresponding to each other.

According to the first alternative embodiment, the intake grill 16 is configured so that the notches of the bars 40 and the notches of the reinforcements 50 are brought to match one another (i.e., one of the bar 40 and the reinforcement 50 is inserted into the notch of the other of the bar 40 and the reinforcement 50), thereby mounting the reinforcements 50 on the bars 40. Then, similarly to the foregoing embodiment, the reinforcements 50 are slid to elastically deform the bars 40, so that the elastically deformed bars 40 are fixed to reinforcements 50. Namely, similar to the foregoing embodiment, the first alternative embodiment realizes the function of deformation means that elastically deforms the bars 40 to generate reaction forces in the bars 40, wherein the deformation means elastically deforms the bars 40 in a certain direction by using a configuration in which the reinforcement 50 is slid to bring one side surface of the reinforcement 50 into contact with one side surfaces of the bars 40. Therefore, according to the first alternative embodiment, the bars 40 are elastically deformed by receiving forces from the reinforcement 50 at portions thereof contacting the reinforcement 50. Alternatively, notches may be formed on only either the bars 40 or the reinforcements 50.

Figure 10:
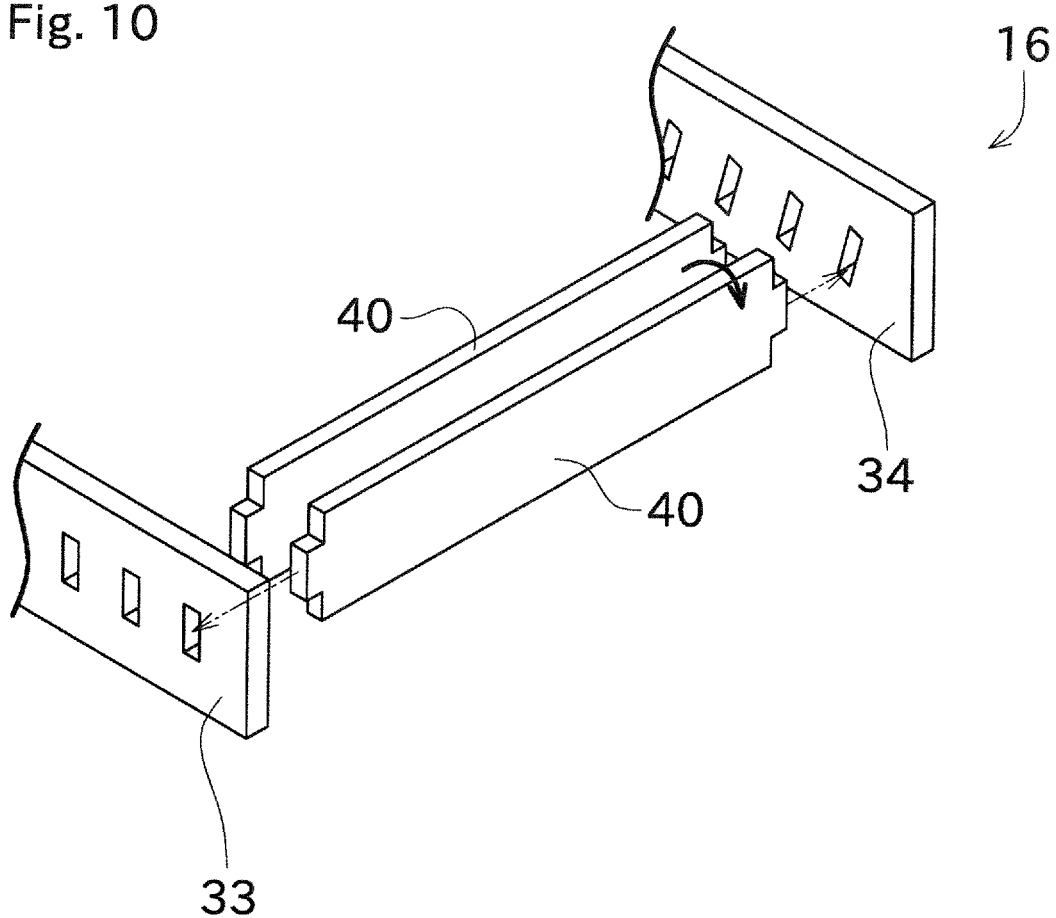
FIG. 10 A perspective view of an intake grill according to a second alternative embodiment in which a force is applied to a bar to elastically deform the bar.

FIG. 10 illustrates an intake grill 16 according to a second alternative embodiment. In this regard, in FIGS. 10 to 12, arrows drawn in dotted lines designate a positional relation of bars 40 to a frame 30. In the foregoing embodiments, the bars 40 are elastically deformed by applying a force to the reinforcement 50. However, the force for elastically deforming the bars 40 may be applied to any member. In FIG. 10, the force is applied to the bars 40 so as to elastically deform the bars 40.

Specifically, protrusions extending in the longitudinal direction are formed on both longitudinal ends of the bar 40. Holes are formed in third and fourth side walls 33 and 34 of the frame 30 so that the protrusions can be inserted into the holes. In this regard, each hole in the fourth side wall 34 slightly deviates from the corresponding hole in the third side wall 33 in their forming direction. More specifically, each hole in the fourth side wall 34 deviates in a rotational direction with respect to the bar's longitudinal direction as its axial direction (in other words, when viewed in the longitudinal direction of the bars 40, the direction of attaching one longitudinal ends of the bars 40 to the frame 30 deviates from the direction of attaching the other longitudinal ends of the bars 40 to the frame 30). Therefore, the bars 40 are twisted so as to insert the protrusions of the bars 40 into the holes in the fourth side wall 34. Afterward, the bars 40 are fixed to the frame 30 by using affixation members such as rivets at need.

In this configuration, each bar 40 receiving the rotational force whose axial direction is defined as the bar's longitudinal direction (elastically deformed in the rotational direction) is fixed to the frame 30. Namely, the second alternative embodiment realizes the function of deformation means that elastically deforms the bars 40 to generate reaction forces in the bars 40, wherein the deformation means elastically deforms the bars 40 by twisting the bars 40 by using a configuration in which the direction of attaching one longitudinal end of the bar 40 to the frame 30 deviates from the direction of attaching the other longitudinal end of the bar 40 to the frame 30.

FIGS. 11(a), 11(b), 12(a) and 12(b) illustrate respective intake grills 16 according to third and fourth alternative embodiments. In each of the intake grills according to the third and fourth embodiments, a force is applied to a frame 30 so as to elastically deform bars 40.

Figure 11A:
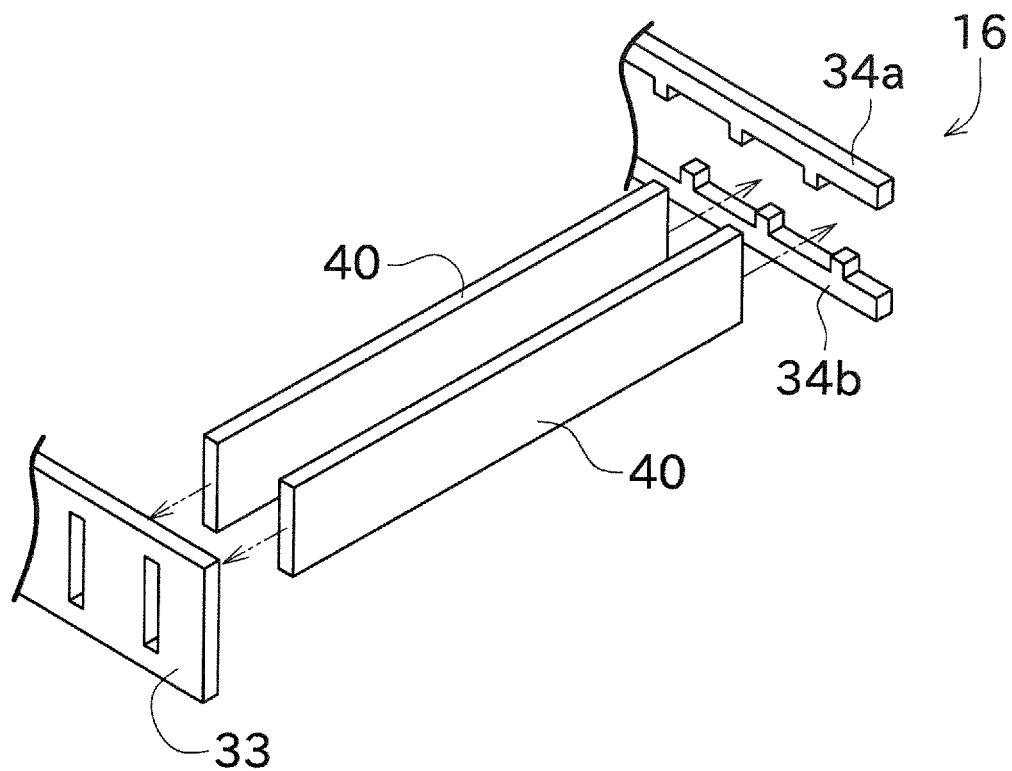
FIGS. 11(a) and 11(b) A perspective view and a sectional side view of an intake grill according to a third alternative embodiment in which a force is applied to a frame to elastically deform bars.
Figure 11B:
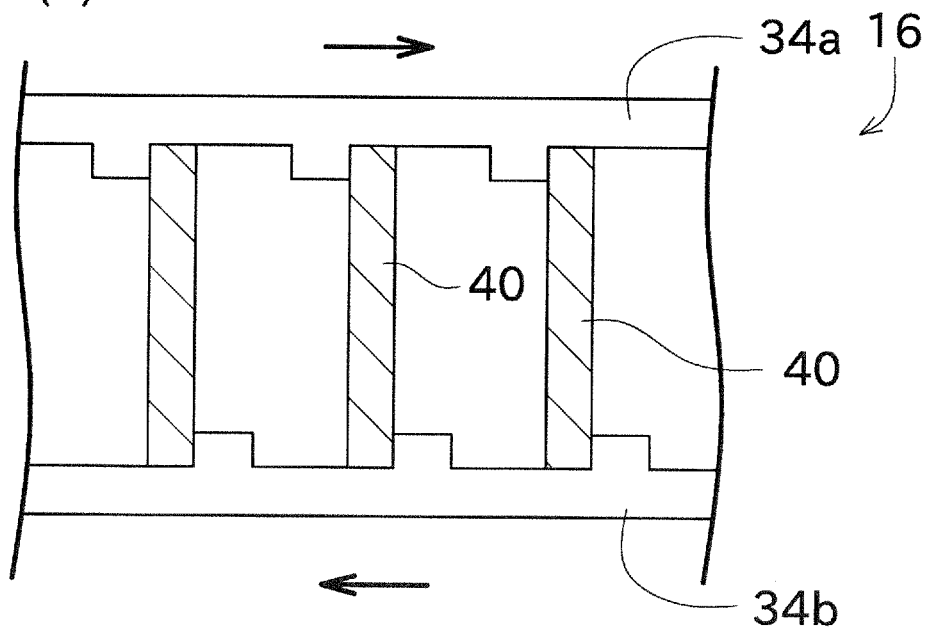

Specifically, according to the third alternative embodiment, as shown in FIG. 11(a), a fourth side wall 34 is configured to include a first portion 34a and a second portion 34b, which are convexo-concave. As shown in FIG. 11(b), convex portions of the first portion 34a contact one side surfaces of the respective bars 40, and convex portions of the second portion 34b contact the other side surfaces of the respective bars 40. On the other hand, a third side wall 33 is formed with holes or slits into which one side longitudinal ends of the respective bars 40 can be inserted.

A torsional force is applied to each bar 40 by sliding the first portion 34a and the second portion 34b in opposite juxtaposition directions as shown in FIG. 1.1(b) when each bar 40 is inserted into the corresponding hole, slit or so on of the third side wall 33 and is disposed between the first portion 34a and the second portion 34b. Therefore, the bar 40 is elastically deformed into a curve, for example. In this state, if necessary, the bar 40 is fixed to the fourth side wall 34 by an affixation member such as a rivet. Therefore, the bar 40 can be fixed while its elastically deformed state is maintained. Namely, similar to the second alternative embodiment, the third alternative embodiment realizes the function of deformation means that elastically deforms the bars 40 to generate reaction forces in the bars 40, wherein the deformation means elastically deforms the bars 40 by twisting the bars 40 by using a configuration in which the direction of attaching one longitudinal end of the bar 40 to the frame 30 deviates from the direction of attaching the other longitudinal end of the bar 40 to the frame 30.

Figure 12A:
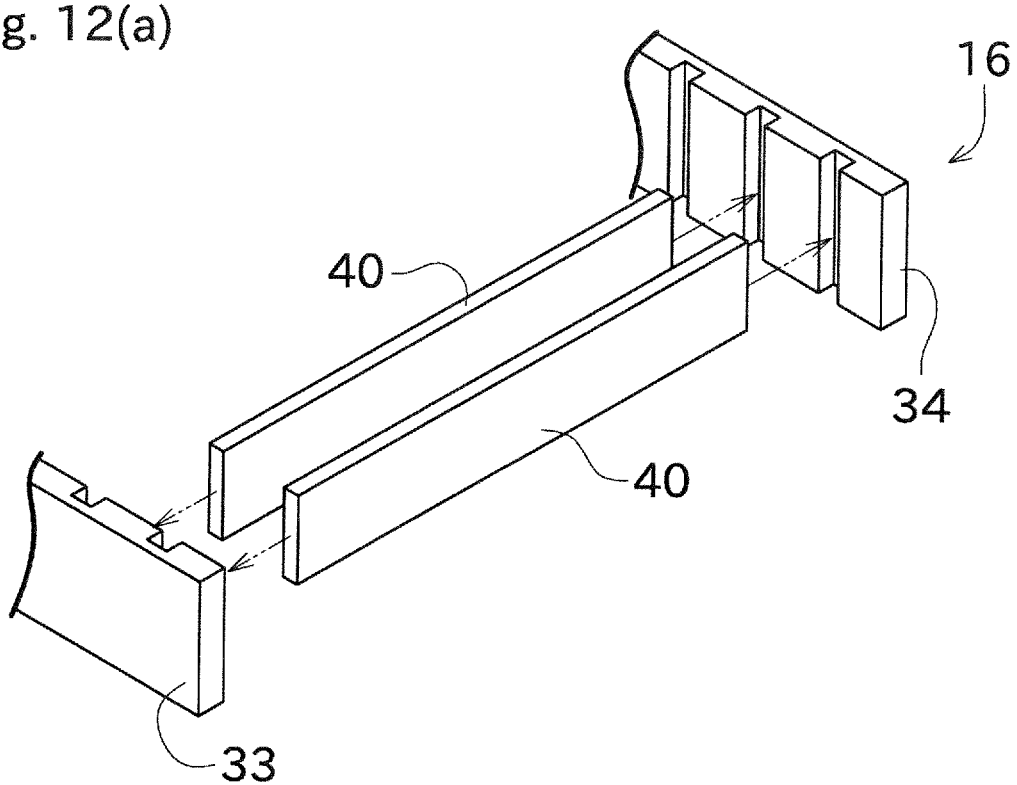
FIGS. 12(a) and 12(b) A perspective view and a plan view of an intake grill according to a fourth alternative embodiment in which a force is applied to a frame to elastically deform bars.
Figure 12B:
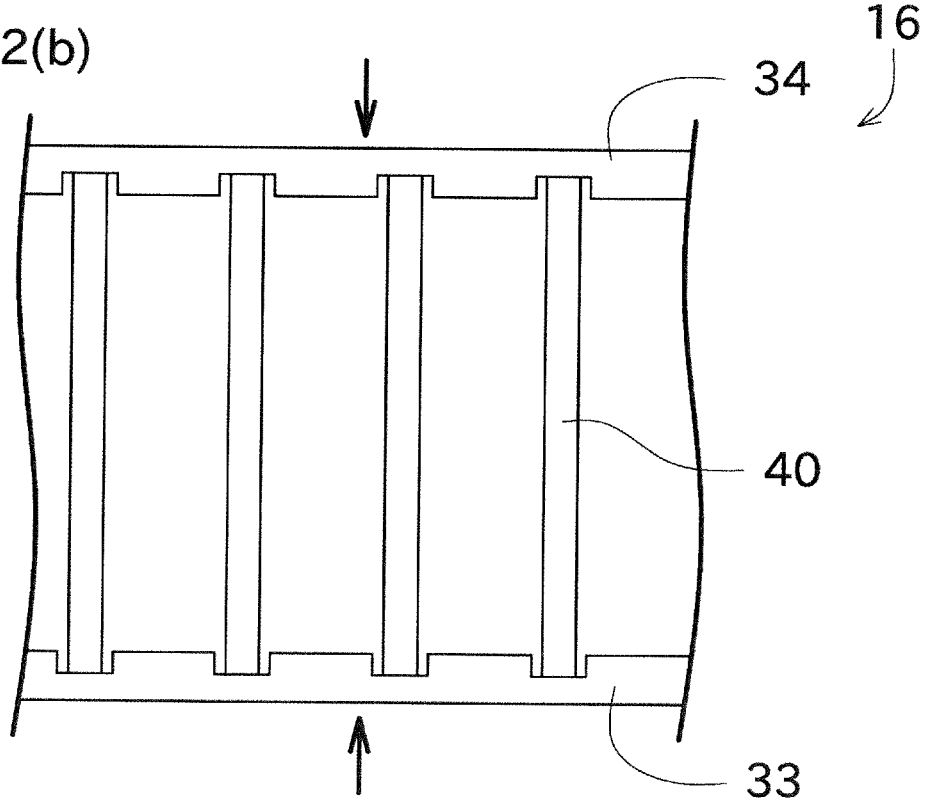

In the fourth alternative embodiment, as shown in FIG. 12(a), third and fourth side walls 33 and 34 are formed with respective slits, and both longitudinal ends of the bar 40 are inserted into the respective slits. As shown in FIG. 12(b), in the state where the bars 40 are inserted into the respective slits of the third and fourth side walls 33 and 34, the third side wall 33 and the fourth side wall 34 are made to approach each other. Therefore, the bars 40 are compressed to buckle, so that the bars 40 are elastically deformed into curves, for example. In this state, if necessary, the bars 40 are fixed to the fourth side wall 34 by affixation members, e.g., rivets. Therefore, the bars 40 can be fixed while their elastically deformed states are maintained. Namely, the fourth alternative embodiment realizes the function of deformation means that elastically deforms the bars 40 to generate reaction forces in the bars 40, wherein the deformation means elastically deforms the bars 40 by using a configuration in which the bars 40 stretched straightly from their curved state are longer than a span between the third side wall 33 and the fourth side wall 34.

Figure 13A:
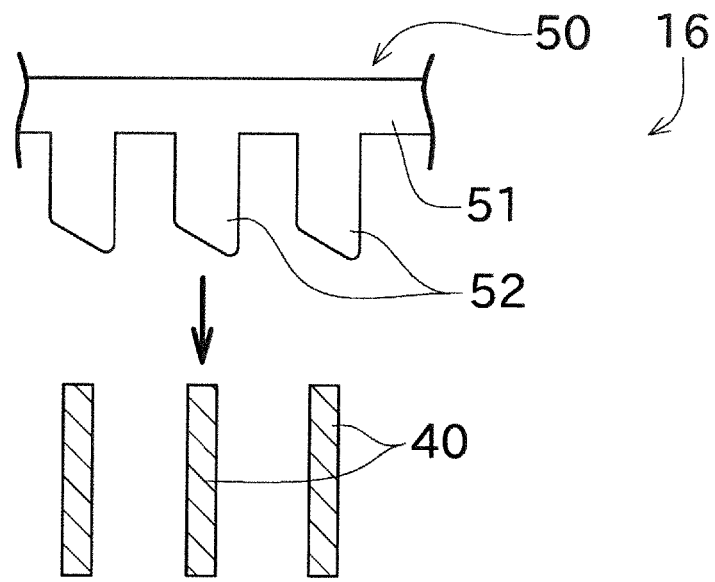
FIGS. 13(a) and 13(b) Sectional views of intake grills according to fifth and sixth alternative embodiments in each of which a force is applied to a reinforcement to elastically deform bars.
Figure 13B:
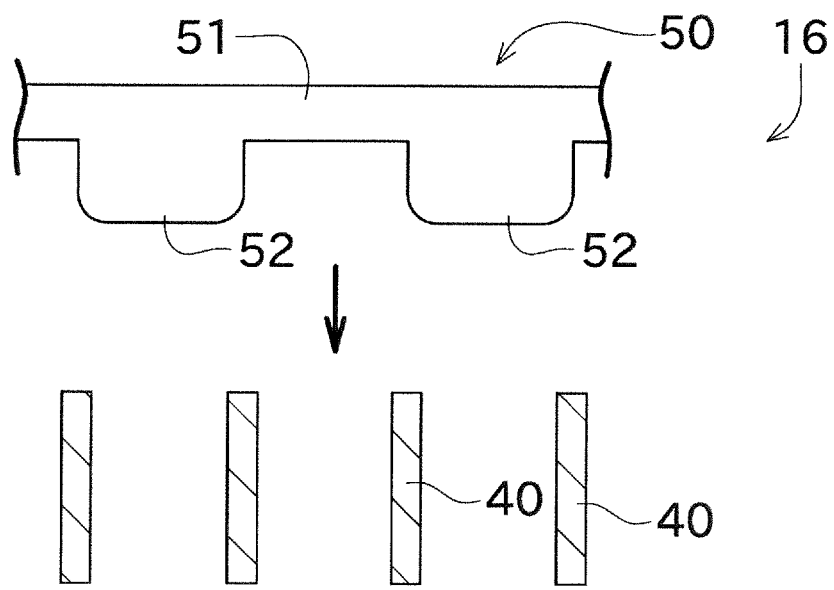

FIGS. 13(a)-13(b) illustrate intake grills 16 according to fifth and sixth alternative embodiments. Each of the intake grills 16 according to the fifth and sixth alternative embodiment includes bars 40 that are elastically deformed not by sliding a reinforcement 50 in the bar's longitudinal direction but when a reinforcement 50 is disposed on the bars 40. Specifically, in each of the fifth and sixth alternative embodiments, protrusions 52 are formed similar to those according to the foregoing embodiment. According to the fifth embodiment, the protrusions 52 have slant bottom surfaces (one side surfaces in the opening's axial direction). According to the sixth embodiment, the protrusions 52 have curved bottom surfaces (one side surfaces in the opening's axial direction).

Due to each of these configurations, by strongly moving the protrusions 52 downward (to one side in the opening's axial direction), the protrusions 52 press top ends of the bars 40 slantwise so as to elastically deform the bars 40 into curved forms in a torsional direction. In the fifth alternative embodiment, each protrusion 52 elastically deforms each bar 40. In the sixth alternative embodiment, each protrusion 52 elastically deforms a pair of bars 40. In this way, each of the fifth and sixth alternative embodiments realizes the function of deformation means that elastically deforms the bars 40 to generate reaction forces in the bars 40, wherein the deformation means elastically deforms the bars 40 by using a configuration in which the protrusions 52 of the reinforcement 50 contact the bars 40 (more specifically, the bars 40 are curved in the vicinity of the portions thereof contacting the bars 40).

As described above, the intake grill 16 according to the foregoing embodiment is provided at the intake opening 14 for sucking air from the interior 11 of the railway vehicle 1. The intake grill 16 comprises the frame 30, the bar 40 and the deformation means. The frame 30 defines an outer edge of the intake opening 14. The bar 40 is a plate-shaped member spanned between portions of the frame 30 so as to connect the portions to each other. The deformation means elastically deforms the bar 40 so as to generate the reaction force in the bar 40.

Therefore, since the elastically deformed bar 40 has the reaction force (elastic force), the bar 40 and another member contacting the bar 40 apply forces to each other so that the bar 40 is prevented from rattling without using an affixation member, welding or so on.

The intake grill 16 according to the foregoing embodiment further comprises the reinforcement 50 disposed to intersect the bar 40. The deformation means elastically deforms the bar 40 by bringing the reinforcement 50 into contact with only one side surfaces of the bar 40.

Therefore, the reinforcement 50 and the bar 40 are prevented from generating rattling therebetween. The bar 40 is fixed to the reinforcement 50 by the elastic force, thereby facilitating work of fixing the reinforcement 50 and the bar 40 to each other even if a space for this work may be narrow.

In the intake grill 16 according to the foregoing embodiment, when the bar 40 deformed by the deformation means is viewed in the axial direction of the intake opening 14 (the opening's axial direction), the bar 40 is formed with the curve expanding in one direction so that the curve of the bar 40 contacts the reinforcement 50 at the maximum expanding portion thereof.

Therefore, the bar 40 can be elastically deformed only by sliding the reinforcement 50, for example. Further, the direction of elastically deforming the bar 40 and the axial direction of the intake opening 14 are perpendicular to each other, thereby realizing a configuration in which the direction of guiding hair by the intake grill 16 is hardly changed.

In the intake grill 16 according to the foregoing embodiment, the reinforcement 50 is multiplied so that the intake grill 16 comprises at least three reinforcements 50 contacting the bar 40, as shown in FIGS. 8(*c*) and 8(*d*). When the bar 40 deformed by the deformation means is viewed in the axial direction of the intake opening 14, the bar 40 is formed with at least three curves at portions thereof contacting the respective reinforcements 50 so that at least one of the curves expands in the direction different from the other curves.

Therefore, the elastic force of the bar 40 is appropriately applied to all the three reinforcements 50 so as to firmly fix the bar 40.

In the intake grill 16 according to the first alternative embodiment, at least either the reinforcement 50 or the bar 40 is formed with the notch so that the remaining reinforcement 50 or the remaining bar 40 is inserted into the notch.

Therefore, the bar 40 and the reinforcement 50 have respective heights equalized to some degree, thereby being minimized.

In the intake grill 16 according to each of the foregoing embodiment and the fifth and sixth alternative embodiments, the reinforcement 50 is formed with the plurality of protrusions 52 protruding in the axial direction of the intake opening 14 and contacting the bar 40. The deformation means elastically deforms the bar 40 by bringing the protrusions 52 into contact with the bar 40.

Therefore, since the plurality of protrusions 52 are formed, a manner of simultaneously elastically deforming the plurality of bars 40 without forming the bars 40 with notches or so on can be employed.

In the intake grill 16 according to each of the second to fourth alternative embodiments, the deformation means elastically deforms the bar 40 by transmitting the force from the frame 30 to the bar 40 via portions of the bar 40 and the frame 30 contacting each other.

Therefore, the frame 30 and the bar 40 are prevented from generating rattling therebetween.

In the intake grill 16 according to each of the second and third alternative embodiments, the deformation means applies the torsional force having the rotational axis in the longitudinal direction of the bar 40 by the difference in direction of attaching the bar 40 to the frame 30 between one longitudinal end of the bar 40 and the other longitudinal end of the bar 40.

Therefore, the bar 40 can be fixed to the frame 30 without sliding the bar 40 or the frame 30, for example.

In the intake grill 16 according to each of the third and fourth alternative embodiments, when the bar 40 deformed by the deformation means is viewed in the axial direction of the intake opening 14, the bar 40 is formed with the curve expanding in one direction.

Therefore, the direction of elastically deforming the bar 40 and the axial direction of the intake opening 14 are perpendicular to each other, thereby realizing a configuration in which the direction of air guided by the intake grill 16 is hardly changed.

The above-mentioned description is given of the preferable embodiment and the alternative embodiments. However, the above-mentioned configurations can be modified as follows, for example.

In the foregoing embodiment, the intake grill 16 is provided at the intake opening 14. Alternatively, it may be provided at the suction opening 19 for blowing air into the vehicle body 3, or at an opening for sucking and blowing air. Further, the intake grill 16 is provided on the course and connected to the air conditioner 13 including the heater part and the cooler part. However, it may be provided on a course only for exhausting the sucked air to an outside. The shape of the intake opening 14 is not limited to the rectangular shape. The intake opening 14 may be formed in a different shape (e.g., a circular, oval or ellipsoid shape).

In the foregoing embodiment, the bar 40 is formed into a bent shape. Alternatively, it may be formed with a gentle curve. Alternatively, the bar 40 may be formed with neither bent nor curve.

In the foregoing embodiment, the air conditioner 13 is disposed on the roof of the vehicle body. Alternatively, it may be disposed at another position (e.g., under a floor of the vehicle body 3). Further, in the foregoing embodiment, the intake opening 14 is formed in the upper surface. Alternatively, it may be formed at another position (e.g., a side surface or a bottom surface). The suction duct 15 is a duct having a straight course. Alternatively, it may have a bent or curved course.

In the foregoing embodiment, the bars 40 are elastically deformed by sliding the reinforcement 50. Alternatively, the bars 40 may be elastically deformed by rotating the reinforcement 50. Alternatively, some of the bars 40 may be elastically deformed by the reinforcement 50, and the remaining bars 40 may be elastically deformed by the frame 30. Alternatively, at least one or some of the bars 40 may be elastically deformed so that one or some of the bars 40 may not be elastically deformed. Alternatively, the bar 40 or bars 40 may be elastically deformed by another member that is not intended to reinforce the bar 40 or bars 40.

DESCRIPTION OF THE REFERENCE NUMERALS

1 a railway vehicle
14 an intake opening (a ventilation opening)
16 an intake grill (an air flow regulator)
30 a frame
40 a bar
50 a reinforcement

The invention claimed is:

1. An airflow regulator provided at a ventilation opening for at least either blowing air to an interior of a railway vehicle or sucking air from the interior of the railway vehicle, comprising:
   a frame defining an outer edge of the ventilation opening;
   a slat which is a plate-shaped member elastically deformed so as to generate a reaction force therein and spanned between portions of the frame so as to connect the portions to each other, the slat being fixed to the frame; and
   a reinforcement disposed to intersect the slat, the reinforcement being movable between an initial configuration in which the reinforcement contacts the slat without deforming the slat and a final configuration in which the reinforcement elastically deforms the slat and the reinforcement is fixed to the frame.

2. The air flow regulator according to claim 1, wherein when the elastically deformed slat is viewed in an axial direction of the ventilation opening, the slat forms a curve displaced in one direction so that the curve of the slat contacts the reinforcement at a maximum expanding portion thereof.

3. The air flow regulator according to claim 1, wherein at least one further reinforcement is added so that the air flow regulator comprises at least three reinforcements contacting the slat, and wherein when the elastically deformed slat is viewed in an axial direction of the ventilation opening, the slat is formed with at least three curves at portions thereof contacting the respective reinforcements so that at least one of the curves expands in a direction different from the other curves.

4. The air flow regulator according to claim 1, wherein at least either the reinforcement or the slat is formed with a notch so that the remaining reinforcement or the remaining slat is inserted into the notch.

5. The air flow regulator according to claim 1, wherein the reinforcement is formed with a plurality of protrusions protruding in an axial direction of the ventilation opening and contacting the slat, and wherein the slat is elastically deformed by bringing the protrusions into contact with the slat.

6. The air flow regulator according to claim 1, wherein the slat is elastically deformed by transmitting a force from the frame to the slat via portions of the slat and the frame contacting each other.

7. The air flow regulator according to claim 6, wherein a torsional force having a rotational axis in a longitudinal direction of the slat is caused by a difference in direction of attaching the slat to the frame between one longitudinal end of the slat and the other longitudinal end of the slat and is applied to the slat to elastically deform the slat.

8. The air flow regulator according to claim 6, wherein when the elastically deformed slat is viewed in an axial direction of the ventilation opening, the slat forms a curve displaced in one direction.

9. The air flow regulator of claim 1, further comprising:
   at least one mounting bracket attached to the frame and configured to fix the reinforcement to the frame.

10. The air flow regulator of claim 9, where the at least one mounting bracket includes a first mounting bracket attached to a portion of the frame and a second mounting bracket attached to the frame opposite of the first mounting bracket, the first and second mounting brackets configured to fix the reinforcement to the frame in the final configuration.

11. The air flow regulator of claim 1, wherein the slat contacts only one side surface of the slat at a time.

12. The air flow regulator of claim 1, further comprising:
   a plurality of slats fixed to the frame; and
   at least one further reinforcement disposed to intersect the plurality of slats, the at least one further reinforcement being movable between the initial configuration the final configuration.

13. A method for manufacturing an air flow regulator provided at a ventilation opening for at least either blowing air to an interior of a railway vehicle or sucking air from the interior of the railway vehicle, the method comprising:
   inserting a slat, which is a plate-shaped member, into a frame defining an outer edge of the ventilation opening to span between portions of the frame;
   fixing the slat to the frame;
   placing a reinforcement between the portions of the frame to intersect the slat; and
   deforming the slat by moving the reinforcement from an initial configuration in which the reinforcement contacts the slat without deforming the slat to a final configuration in which the reinforcement elastically deforms the slat and the reinforcement is fixed to the frame.

14. The method according to claim 13, further comprising:
   fixing the reinforcement to the frame via at least one mounting bracket.

15. The method according to claim 13, wherein the air flow regulator includes a plurality of slats fixed to the frame and a further reinforcement disposed to intersect the plurality of slats.

16. The method according to claim 15, wherein the reinforcement is moved in a first direction from the initial configuration to the final configuration and the further reinforcement is moved in a second direction from the initial configuration to the final configuration.

17. The method according to claim 16, wherein the first direction is opposite of the second direction.

18. The method according to claim 13, wherein the reinforcement contacts only one side surface of the slat at a time.

* * * * *